(12) United States Patent
Grace

(10) Patent No.: US 6,321,043 B1
(45) Date of Patent: Nov. 20, 2001

(54) CONTROL OF HALFTONE AND SOLID AREA IMAGE QUALITY BY WAY OF A HALFTONE DISCHARGE RATIO

(75) Inventor: Robert E. Grace, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/735,326

(22) Filed: Dec. 12, 2000

(51) Int. Cl.$^7$ .................................................. G03G 15/00
(52) U.S. Cl. ................... 399/46; 399/48; 399/49
(58) Field of Search ........................ 399/46, 48, 49, 399/72, 50, 51, 53; 358/521, 45

(56) References Cited

U.S. PATENT DOCUMENTS

| | | | |
|---|---|---|---|
| 5,075,725 | * 12/1991 | Rushing et al. | 399/49 X |
| 5,367,361 | 11/1994 | Henderson | 355/208 |
| 5,436,705 | 7/1995 | Raj | 355/246 |
| 5,749,021 | 5/1998 | Mestha et al. | 399/49 |
| 5,987,271 | * 11/1999 | Regelsberger et al. | 399/46 X |
| 6,021,288 | * 2/2000 | Okuno et al. | 399/72 |

* cited by examiner

*Primary Examiner*—Joan Pendegrass
(74) *Attorney, Agent, or Firm*—Mark Z. Dudley

(57) ABSTRACT

In an electrostatic and development control in a printing apparatus, unwanted variation in dot size and shape may be stabilized and the DMA variability under halftone control may be decreased, by use of a novel halftone discharge ratio ($HTDR_{midtone}$) along with the conventional actuators of development potential, cleaning potential, and exposure level. A three-input, three-output MIMO control system may be constructed to deliver superior regulation of halftone and solid area image quality with use of control algorithms that are based on the halftone discharge ratio and with use of as few as two developed halftone test patches.

7 Claims, 2 Drawing Sheets

Figure 1:
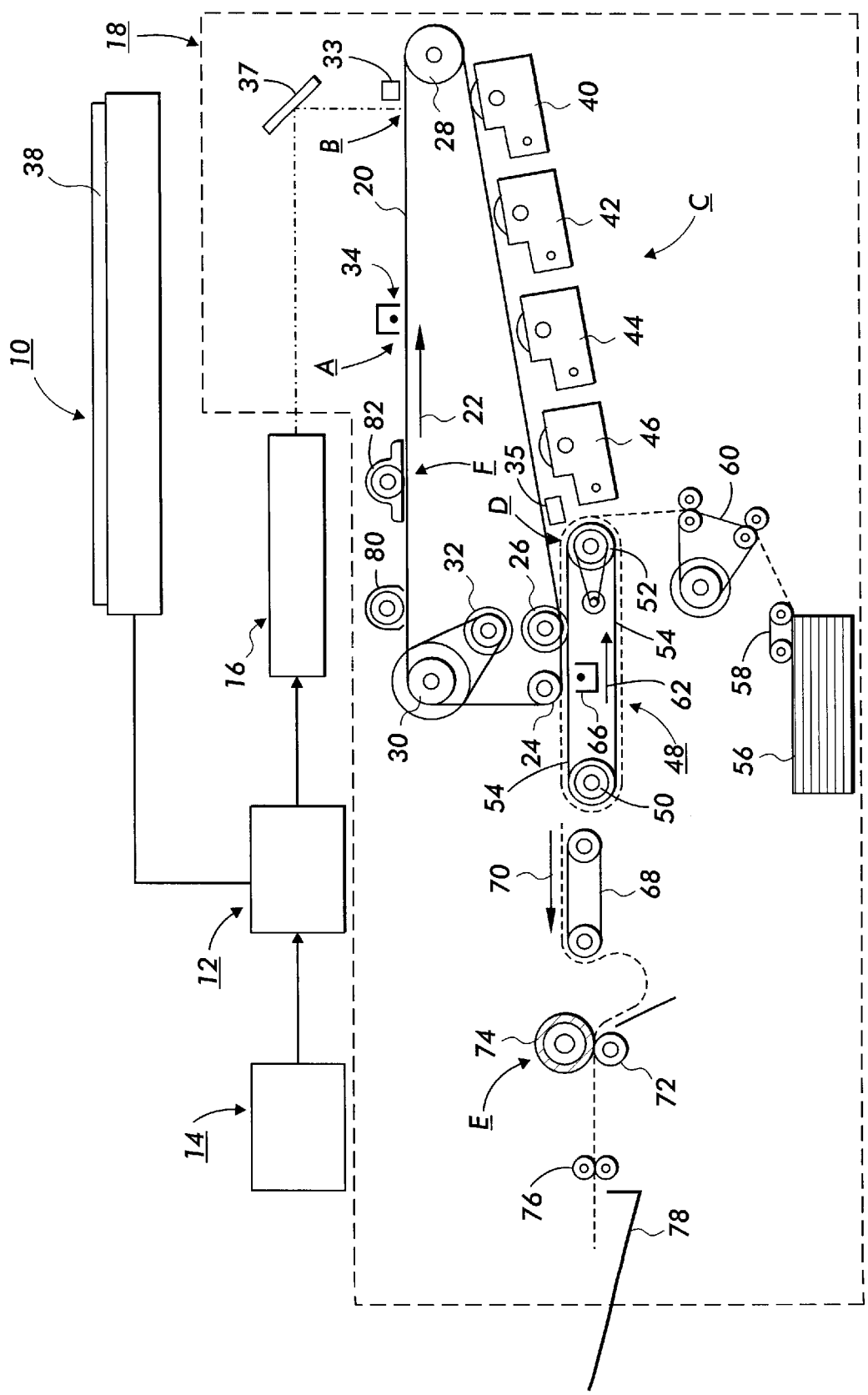

CONTROL OF HALFTONE AND SOLID AREA IMAGE QUALITY BY WAY OF A HALFTONE DISCHARGE RATIO

This invention relates generally to an electrostatographic printing apparatus and, more particularly, concerns the control of developed mass per unit area (DMA) in real time using internal process parameters as actuators.

The basic reprographic process used in an electrostatographic printing apparatus generally involves an initial step of charging a photoreceptor member to a substantially uniform potential. The charged surface of the photoreceptor member is thereafter exposed to a light image of an original document to selectively dissipate the charge thereon in selected areas. This procedure records an electrostatic latent image on the photoreceptor member that corresponds to the original document being reproduced. The latent image is then developed by use of toner particles adhering triboelectrically to carrier granules. The toner particles are attracted away from the carrier granules to the latent image, forming a toner image on the photoreceptor member which is subsequently transferred to a copy sheet. In the case of Charged Area Development (CAD) the development bias voltage and toner polarity are chosen such that toner is attracted to undischarged areas of the photoreceptor; in the case of Discharged Area Development (DAD), the developer bias voltage and toner polarity are chosen such that toner is attracted to discharged areas of the photoreceptor. The copy sheet is then advanced to a fusing station for permanently affixing the toner image to the copy sheet.

In electrostatographic apparatus using a drum-type or an endless belt-type photoreceptor member, the photosensitive surface can contain more than one image at one time as it moves through various processing stations. The portions of the photosensitive surface containing the projected images, so-called "image areas", are usually separated by a segment of the photosensitive surface called the inter-document space. After charging the photosensitive surface to a suitable charge level, the inter-document space segment of the photosensitive surface is generally discharged by a suitable lamp in the case of CAD development to avoid attracting toner particles. Various areas on the photosensitive surface, therefore, will be charged to different voltage levels. For example, there will be the high voltage level of the initial charge on the photosensitive surface, a selectively discharged image area of the photosensitive surface, and a fully discharged portion of the photosensitive surface between the image areas if CAD development is employed.

The approach utilized for multicolor electrostatographic printing is similar to the process described above. However, rather than forming a single latent image on the photoreceptor surface in order to reproduce an original document, as in the case of black and white printing, multiple latent images corresponding to color separations are sequentially recorded on the photoreceptor surface. Each single color electrostatic latent image is developed with toner of a color complementary thereto and the process is repeated for differently colored images with the respective toner of complementary color. Thereafter, each single color toner image can be transferred to the copy sheet in superimposed registration with the prior toner image, creating a multi-layered toner image on the copy sheet. Finally, this multi-layered toner image is permanently affixed to the copy sheet to form a finished color copy.

In copying or printing systems, such as a xerographic copier, laser printer, or ink-jet printer, a common technique for monitoring the quality of prints is to create a "test patch" of a predetermined desired density. The actual density of the printing material (toner or ink) in the test patch can then be optically measured by a suitable sensor to determine the effectiveness of the printing process in subsequently placing this printing material on the print sheet.

In the case of xerographic devices, such as a laser printer, the surface that is typically of most interest is the charge-retentive surface or photoreceptor, on which the electrostatic latent image is formed. The optical sensor for determining the density of toner on the test patch, which is often referred to as a "densitometer", is typically disposed along the path of the photoreceptor, directly downstream of the development unit. A routine within the operating system of the printer periodically creates test patches of a desired density at predetermined locations on the photoreceptor by deliberately causing the exposure system thereof to discharge the surface to a predetermined extent.

The test patch is then moved past the developer unit and the toner particles within the developer unit are caused to adhere to the test patch electrostatically. The developed test patch is moved past a densitometer disposed along the path of the photoreceptor, and the light absorption of the test patch is tested. The sensor readings are then used to measure and control the tone response curve (TRC) and make suitable adjustments to the system such as changing developer bias, photoreceptor charging potential, or exposure level to maintain consistent quality.

High quality digital copiers and laser printers are expected to deliver tight control of halftone and solid area image densities. Typical specifications call for very small print delta E variation at every point on the tone response curve over the course of a day. This task is especially challenging for control of black and white images, because reflection-type optical sensors will saturate at a level well below the desired solid area developed mass (DMA) level; as a result, the conventional approach to determine image quality of a solid black area is based upon an inference from halftone measurements.

Conventional approaches to the foregoing problems typically require image quality control systems that employ a high computational complexity or very large numbers of sampled test patches. Accordingly, there is a need for an image quality control system operable in an electrostatographic printing apparatus that is better able to actuate subsystem parameters using the known relations of the physical xerography process to control DMA.

In high quality digital electrophotography, it is important to maintain a stable relationship between halftone input coverage (Cin), effected by the latent image recording device, and the output of the marking process. A measure of this relationship may be expressed as image density or delta E from paper. In desirable practice, the resultant tone response curve should be held within a narrow range over the course of the print job (i.e., within-run) and over the course of a day (i.e., within-day).

Heretofore, for black areas, adequate control of DMA has been less than successful. Even before the image density corresponding to 100% Cin is reached, the reflectance-type optical sensors will saturate. Even small amounts of measurement uncertainty in the system make it very difficult to infer DMA from halftone patch reflectance measurements taken below the saturation level. For example, there may be successful control of TRC output at low and mid-level values of Cin, at which the test patches can be measured with a good signal-to-noise ratio, but the overall DMA variation at 100% Cin can remain much larger than is desirable. Such variation of black solid area quality is a significant source of image degradation even when as many as three black halftone test patches are used. Furthermore, such variation typically increases as the halftone screen frequency is increased.

The root cause of this variation (in the relationship between the halftone test patch reflectance and DMA) is due to the sensitivity of halftone dot shape and size to noise factors such as raster output scanner (ROS) spot size and subtle changes in the shape of the photo-induced discharge curve (PIDC). These changes perturb the relationship between the reflectance of a test patch and the corresponding determination of DMA. These factors can be comparable in magnitude to the sensitivity of the levels of midtone and shadow halftone delta E to DMA, and therefore will contribute large errors to the subsequent estimation of DMA from halftone patches.

According to the present invention, and in a significant departure from the prior art, this variation in dot size and shape may be stabilized and the DMA variability under halftone control may be decreased by use of a novel halftone discharge ratio ($HTDR_{midtone}$) with the conventional actuators of development potential, cleaning potential, and ROS exposure level. In one embodiment of the present invention, a 3 input, 3 output multi-input multi-output (MIMO) control system may be constructed to deliver superior regulation of halftone and solid area image quality with use of control algorithms that are based on the halftone discharge ratio ($HTDR_{midtone}$) and with use of as few as two developed halftone test patches.

In another aspect of the present invention, internal process parameters such as ROS exposure level, cleaning voltage, and development voltage are used as actuators.

A detailed description of the exemplary embodiments may now be understood with reference to the Figures. Although the present invention will now be described in connection with one or more embodiments, such description is not intended to be so limited. On the contrary, it is intended to cover all alternatives, modifications, and equivalents as may be included within the spirit and scope of the invention as defined by the appended claims. In the following description, usage of like reference numerals will designate identical elements.

FIG. 1 is a schematic elevational view of an exemplary multi-color electrophotographic printing apparatus which can be utilized in the practice of the present invention.

Figure 2:
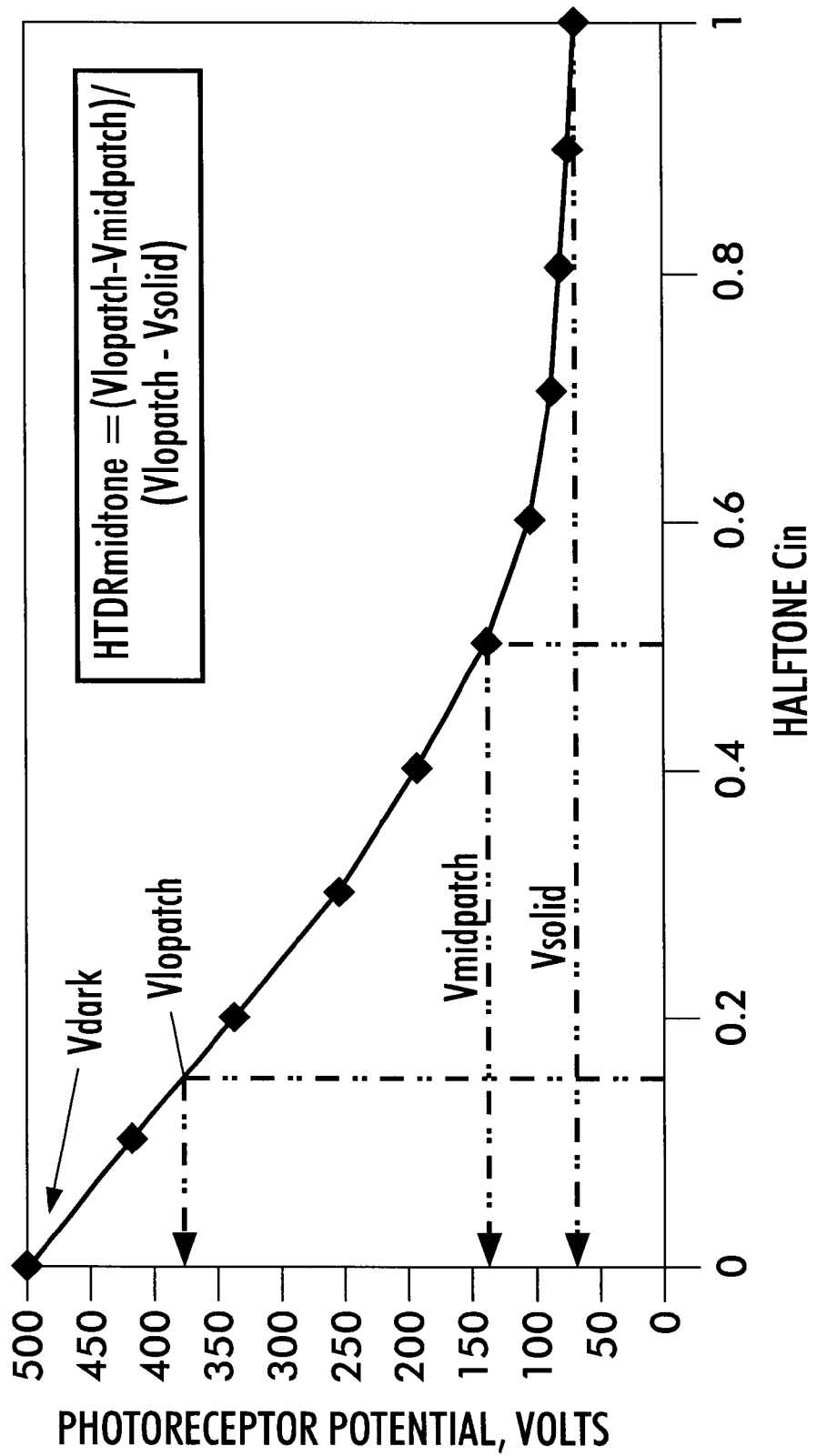

FIG. 2 is a graphical representation of a novel halftone discharge ratio for use in electrostatic and development control in the printing apparatus FIG. 1, in accordance with the present invention. The halftone discharge ratio shown in FIG. 2 is a preferred embodiment for use in systems employing Discharged Area Development. A similar function can readily be defined according to the teachings herein for systems that employ Charged Area Development.

A schematic elevational view showing an exemplary electrophotographic printing apparatus incorporating the features of the present invention therein is shown in FIG. 1. It will become evident from the following discussion that the present invention is equally well-suited for use in a wide variety of printing systems including ionographic printing apparatus, as well as other more general non-printing systems providing multiple or variable outputs such that the invention is not necessarily limited in its application to the particular system shown herein. Accordingly, reference is made to commonly-assigned U.S. Pat. Nos. 5,367,361; 5,436,705; and 5,749,021; the disclosure of which are incorporated herein by reference.

To initiate the copying process, a multicolor original document 38 is positioned on a raster input scanner (RIS), indicated generally by the reference numeral 10. The RIS 10 captures the entire image from original document 38, converts the image to a series of raster scan lines, and measures a set of primary color densities, i.e. red, green, blue and black densities, at each point of the original document. This information is transmitted as an electrical signal to a control and image processing system, indicated generally by the reference numeral 12, which converts the set of red, green, blue and black density signals to a set of calorimetric coordinates. The control and image processing system 12 contains control electronics to maintain image quality and compensate for copy to copy density variations. For example, the control and image processing system 12 is operable for preparing and managing the image data flow to a raster output scanner (ROS), indicated generally by the reference numeral 16.

A user interface (UI), indicated generally by the reference numeral 14, is provided for communicating with control and image processing system 12. The output signal from UI 14 is transmitted to control and image processing system 12 which then transmits signals corresponding to the desired image to ROS 16.

The illustrated example of ROS 16 includes a laser with rotating polygon mirror blocks. The ROS 16 illuminates, via mirror 37, a charged portion of a photoreceptor belt 20 of a printer or marking engine, indicated generally by the reference numeral 18. The ROS 16 exposes the photoreceptor belt 20 to record a set of four subtractive primary latent images thereon corresponding to the signals transmitted from control and image processing system 12. These developed images are subsequently transferred to a copy sheet in superimposed registration with one another to form a multicolored image on the copy sheet which is then fused thereto to form a color copy.

With continued reference to FIG. 1, marking engine 18 is an electrophotographic printing apparatus comprising photoreceptor belt 20 which is entrained about transfer rollers 24 and 26, tensioning roller 28, and drive roller 30. Drive roller 30 is rotated by a motor or other suitable mechanism coupled to the drive roller 30 by suitable means such as a belt drive 32. As roller 30 rotates, it advances photoreceptor belt 20 in the direction of arrow 22 to sequentially advance successive portions of the photoreceptor belt 20 through the various processing stations disposed about the path of movement thereof.

Initially, a portion of photoreceptor belt 20 passes through a charging station, indicated generally by the reference letter A. At charging station A, a corona generating device 34 or other charging device generates a charge voltage to charge photoreceptor belt 20 to a relatively high, substantially uniform voltage potential.

Next, the charged photoreceptor surface is rotated to an exposure station, indicated generally by the reference letter B. Exposure station B receives a modulated light beam corresponding to information derived by RIS 10. The modulated light beam impinges on the surface of photoreceptor belt 20, selectively illuminating the charged surface of photoreceptor belt 20 to form an electrostatic latent image thereon. The photoreceptor belt 20 may be exposed four times to record four latent images representing each color and black.

The photoreceptor belt is advanced toward a development station, indicated generally by the reference letter C. However, before reaching the development station C, the photoreceptor belt 20 passes subjacent to a voltage monitor, preferably an electrostatic voltmeter (ESV) 33 or electrometer, for measurement of the voltage potential at the surface of the photoreceptor belt 20. The electrostatic voltmeter 33 can be any suitable type known in the art wherein the potential on the photoreceptor surface of the belt 20 is sensed, such as disclosed in U.S. Pat. Nos. 3,870,968 4,205,257; or 4,853,639; the contents of which are incorporated by reference herein.

Suitable measurement circuits are combined with the electrostatic voltmeter circuit for providing an output which can be input to a control circuit, as for example, the control circuit of the present invention. The voltage potential measurement of the photoreceptor belt 20 is utilized to determine specific parameters for maintaining a predetermined halftone discharge ratio on the photoreceptor surface, as will be understood with reference to the specific subject matter of the present invention, explained in detail hereinbelow with reference to FIG. 2.

The development station C includes four individual developer units indicated by reference numerals 40, 42, 44 and 46 and an optical sensor 35. Developer units 40, 42, 44, and 46, respectively, apply toner particles of a specific color corresponding to the complement of the specific color separated electrostatic latent image recorded on the photoreceptor surface.

After development, the toner image is moved past a suitable densitometer or toner area coverage sensor 35 such as disclosed in U.S. Pat. No. 5,060,013 and then to a transfer station, indicated generally by the reference letter D. Transfer station D includes a transfer zone, defining the position at which the toner image is transferred to a sheet of support material, which may be a sheet of plain paper or any other suitable support substrate. A sheet transport apparatus, indicated generally by the reference numeral 48, moves the sheet into contact with photoreceptor belt 20. Sheet transport 48 has a belt 54 entrained about a pair of substantially cylindrical rollers 50 and 52. A friction retard feeder 58 advances the uppermost sheet from stack 56 onto a pre-transfer transport 60 for advancing a sheet to sheet transport 48 in synchronism with the movement thereof so that the leading edge of the sheet arrives at a pre-selected position, i.e. a loading zone. The sheet is received by the sheet transport 48 for movement therewith in a recirculating path. As belt 54 of transport 48 moves in the direction of arrow 62, the sheet is moved into contact with the photoreceptor belt 20, in synchronism with the toner image developed thereon. The transfer zone 64 includes a corona generating device 66 so as to charge the sheet to the proper magnitude and polarity for attracting the toner image from photoreceptor belt 20.

After the last transfer operation, the sheet transport system directs the sheet to a vacuum conveyor 68 which transports the sheet, in the direction of arrow 70, to a fusing station, indicated generally by the reference letter E, where the transferred toner image is permanently fused to the sheet. The fusing station includes a heated fuser roll 74 and a pressure roll 72. Thereafter, the sheet is advanced by a pair of rolls 76 to a catch tray 78 for subsequent removal therefrom by the machine operator.

A cleaning station is indicated generally by the reference letter F. A lamp 80 illuminates the surface of photoreceptor belt 20 to remove any residual charge remaining thereon. Thereafter, a rotatably mounted brush 82 is positioned in the cleaning station and maintained in contact with photoreceptor belt 20 to remove residual toner particles remaining from the transfer operation prior to the start of the next successive imaging cycle.

A diagrammatic representation of a novel halftone discharge ratio amenable for use in a control system for one or more xerographic print engines employing Discharged Area Development is shown in FIG. 2. The control and image processing system 12 includes one or more controllers for providing suitable control signals to the electrostatic charging and exposure systems shown in FIG. 1. For example, the electrostatic charging and exposure systems are tracked by the ESV 33 and other sensors, the outputs of which are sensed signals. These signals are compared with suitable references or target values to provide error signals to an internal controller.

In accordance with the present invention, the setpoints or target values for the electrostatic control system, and control signals for the charging, exposure, and development systems, are generated from the controllers. Preferably, the illustrated control and image processing system 12 uses three internal process parameters, in particular, ROS exposure level (affecting the dot growth largely in the mid-toned regions as compared to solid areas), cleaning voltage (affecting background and dot growth of the image on the photoreceptor), and development voltage (affecting the development of toner on the image throughout the byte space) as three actuators. These three parameters in turn generate appropriate targets as well as a donor voltage for subsequent actuation of the subsystem parameters using the known relations of the physical xerography process. In the preferred embodiment, a three input, three output MIMO control system may thus be constructed to deliver superior regulation of halftone and solid area image quality with use of control algorithms that are based on the halftone discharge ratio (HTDR) described herein with use of as few as two developed halftone test patches, i.e., patches at low halftone area coverage (approximately 5 to 20%) and at midtone (approximately 30–70%).

The novel halftone discharge ratio is based upon a midtone level (described herein as $\text{HTDR}_{midtone}$) and may be calculated as follows:

$$\text{HTDR}_{midtone} = (V_{lopatch} - V_{midpatch})/(V_{lopatch} - V_{solid})$$

$\text{HTDR}_{midtone}$ is thus a ratio that is focused on that portion of the PIDC which is most critical to stable halftone development. When under control and at its setpoint, $V_{lopatch}$ is representative of the approximate onset voltage for development. $V_{solid}$ represents the voltage at which DMA is achieved, and $V_{midpatch}$ represents the critical halftone with most noise factors included in the measurement. By holding $\text{HTDR}_{midtone}$ to a substantially constant value, the control system can stabilize midtone dot shape and size with respect to the current PIDC and the development curve in the presence of major noise factors. The result is reduced sensitivity of midtone patch reflectance to noise factors, and allows the DMA sensitivity to dominate. In the illustrated embodiment, $V_{lopatch}$, $V_{midpatch}$, and $V_{solid}$ are photoreceptor surface potentials of latent halftone test patch images measured by the electrostatic voltmeter (ESV) 33.

A control sensitivity matrix which employs $\text{HTDR}_{midtone}$ may be implemented as:

$$\begin{pmatrix} \Delta fac_{lopatch} \\ \Delta HTDR_{midtone} \\ \Delta fac_{midpatch} \end{pmatrix} = \begin{pmatrix} S_{11} & S_{12} & S_{13} \\ S_{21} & S_{22} & S_{23} \\ S_{31} & S_{32} & S_{33} \end{pmatrix} \begin{pmatrix} \Delta Vcm \\ \Delta Exp \\ \Delta Vme \end{pmatrix}$$

where $S_{11}$–$S_{33}$ are representative of sensitivity parameters, $\Delta fac_{lopatch}$ is representative of a change in the output fractional area coverage (that is, substantially equal to 1 - Reflectance) of the lightest halftone control patch; $\Delta fac_{midpatch}$ is representative of a change in the corresponding output fractional area coverage of the midtone patch, $\Delta Vcm$ is representative of a change in cleaning potential, ΔExp is representative of a change in imager exposure, ΔVme is representative of a change in development potential, and ΔHTDR$_{midtone}$ is representative of a change in HTDR$_{midtone}$ as defined herein.

In the exemplary control sensitivity matrix, the main effects are along the diagonal; that is, Δfac$_{lopatch}$ is primarily sensitive to ΔVcm, ΔHTDR$_{midtone}$ is primarily sensitive to ΔExp, and Δfac$_{midtone}$ is primarily sensitive to ΔVme. The off-diagonal terms represent interactions which are generally much smaller than the main effects. Accordingly, a suitable controller may be implemented according to the foregoing relationships with simple linear equations. Note that ΔHTDR$_{midtone}$ is used as a way of transforming data from the electrostatic voltmeter sensor, not as an actuator. That is, ΔHTDR$_{midtone}$ will react to changes in noise factors, and ΔExp operates as an actuator to return HTDR$_{midtone}$ to its setpoint.

The disclosed embodiments of printing apparatus may be operated and controlled by appropriate operation of HTDR$_{midtone}$ and the actuators described hereinabove. It is well known and preferable to program and execute a variety of control functions, e.g., imaging, printing, paper handling, and other such functions in logic-based control systems, e.g., "controllers", such as with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system(s) or method(s) may be implemented partially or fully in a networked, embedded, or other ancillary controller, or in firmware, and by using standard logic circuits, programmable arrays, or single chip VLSI designs.

The terms "imaging", "reprographic", or "reproduction" apparatus, and "printing" or "printer", as used herein, broadly encompasses various printers, copiers, or multifunction machines and systems, which include electrographic, electrostatographic, or similar marking technologies, unless otherwise defined in a claim. The term "sheet" herein refers to a generally planar segment of paper, plastic, or other suitable physical substrate amenable to receiving a developed image, whether precut or web-fed. A "copy sheet" may be abbreviated as a "copy" or called a "hardcopy".

As to specific components of the subject apparatus or methods, or alternatives therefor, it will be appreciated that such components are optional if so designated. If such components are known per se in other apparatus or applications, other versions may be additionally or alternatively used, especially those from art cited herein. All references cited in this specification, and their references, are incorporated by reference herein where appropriate for teachings of additional or alternative details, features, and/or technical background.

What is claimed is:

1. In an imaging apparatus having an imaging member and electrostatic and development subsystems, a control system responsive to imaging member voltage potential, developed mass per unit area on the imaging member, and a halftone discharge ratio based upon a midtone level (HTDR$_{midtone}$) for adjustment of at least one of the electrostatic and development subsystems, wherein the halftone discharge ratio is determined as follows:

$$HTDR_{midtone} = (V_{lopatch} - V_{midpatch})/(V_{lopatch} - V_{solid})$$

wherein $V_{lopatch}$ is representative of the surface potential of a selected low density halftone latent image, $V_{solid}$ is representative of a voltage at which a desired solid area developed mass (DMA) level is achieved, and $V_{midpatch}$ is representative of the surface potential of a selected midtone latent image.

2. The imaging apparatus of claim 1, wherein the imaging member further comprises a photoreceptor, and further comprising an ESV sensor responsive to voltage potential of the photo receptor and providing therefrom an indication of the imaging member voltage potential.

3. The imaging apparatus of claim 1, further comprising a sensor for measuring the level of developed mass per unit area.

4. The imaging apparatus of claim 1, further comprising at least two test patches on the imaging member respectively providing the selected low density halftone latent image and the selected midtone latent image.

5. The imaging apparatus of claim 1, wherein the control system operates according to a control sensitivity matrix responsive to selected internal process parameters including first and second developed halftone test patches, as follows:

$$\begin{pmatrix} \Delta fac_{lopatch} \\ \Delta HTDR_{midtone} \\ \Delta fac_{midpatch} \end{pmatrix} = \begin{pmatrix} S_{11} & S_{12} & S_{13} \\ S_{21} & S_{22} & S_{23} \\ S_{31} & S_{32} & S_{33} \end{pmatrix} \begin{pmatrix} \Delta Vcm \\ \Delta Exp \\ \Delta Vme \end{pmatrix}$$

wherein $S_{11}$–$S_{33}$ are representative of sensitivity parameters, Δfac$_{lopatch}$ is representative of a change in output fractional area coverage of a first halftone control patch, Δfac$_{midpatch}$ is representative of the change in a corresponding output fractional area coverage of second patch, ΔVcm is representative of a change in the cleaning potential, ΔExp is representative of a change in exposure, ΔVme is representative of a change in development potential, and ΔHTDR$_{midtone}$ is representative of a change in HTDR$_{midtone}$.

6. The imaging apparatus of claim 1, wherein $V_{lopatch}$ is determined from the surface potential of a selected low density halftone latent image having Cin in the range of 5–20%, wherein cin is halftone input coverage.

7. The imaging apparatus of claim 1, wherein $V_{midpatch}$ is determined from the surface potential of a selected midtone latent image having Cin in the range of 30–70%, wherin cin is halftone input coverage.

* * * * *